US012071971B2

(12) United States Patent
Starzynski et al.

(10) Patent No.: US 12,071,971 B2
(45) Date of Patent: Aug. 27, 2024

(54) CARRIER FOR MOUNTING OF PANEL INSERTS

(71) Applicant: Lockheed Martin Corporation, Bethesda, MD (US)

(72) Inventors: Eric Starzynski, Conifer, CO (US); Jason C. Trabert, Denver, CO (US); Jason R. Fick, Denver, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 799 days.

(21) Appl. No.: 17/213,571

(22) Filed: Mar. 26, 2021

(65) Prior Publication Data
US 2022/0307541 A1    Sep. 29, 2022

(51) Int. Cl.
  *F16B 37/12*  (2006.01)
  *F16B 5/02*  (2006.01)
(52) U.S. Cl.
  CPC .......... *F16B 37/122* (2013.01); *F16B 5/0208* (2013.01); *F16B 5/0241* (2013.01); *F16B 37/12* (2013.01)
(58) Field of Classification Search
  CPC ........ F16B 5/01; F16B 5/0208; F16B 5/0241; F16B 11/006; F16B 13/141; F16B 37/122; F16B 37/12; Y10S 411/93
  USPC .............................. 411/82, 82.1, 258; 16/2.1
  See application file for complete search history.

(56) References Cited

U.S. PATENT DOCUMENTS

| | | | |
|---|---|---|---|
| 3,016,578 A * | 1/1962 | Rohe | F16B 5/01 428/116 |
| 3,384,142 A | 5/1968 | Phelan | |
| 3,468,358 A | 9/1969 | Neuschotz | |
| 3,884,006 A | 5/1975 | Dietlein | |
| 4,898,756 A * | 2/1990 | Oefner | F16B 37/122 428/596 |
| 4,902,180 A * | 2/1990 | Gauron | B29C 66/72525 52/704 |
| 5,093,957 A * | 3/1992 | Do | E04C 2/365 52/793.1 |
| 5,240,543 A | 8/1993 | Fetterhoff et al. | |
| 5,632,582 A * | 5/1997 | Gauron | F16B 5/01 411/258 |
| 6,394,722 B1 | 5/2002 | Kunt et al. | |
| 7,195,436 B1 * | 3/2007 | Stephen | F16B 5/01 411/376 |
| 2008/0226413 A1* | 9/2008 | Stephen | F16B 5/0208 411/103 |
| 2015/0362005 A1 | 12/2015 | Meyers | |

(Continued)

OTHER PUBLICATIONS

International Application No. PCT/US2022/021923, International Search Report, Written Opinion, 10 pages, Jun. 21, 2022.

(Continued)

*Primary Examiner* — Roberta S Delisle (57) ABSTRACT

Provided herein are various enhancements for panel inserts which can provide for mounting of threaded fasteners or other mounting members into various panels. In one example, a panel insert carrier comprises a barrel having flanged ends. The barrel comprising an axial bore therein having a threaded surface configured to removably accept a threaded insert. At least one of the flanged ends comprises an aperture for injection of potting around an exterior of the barrel when inserted into a bore hole of a panel.

20 Claims, 6 Drawing Sheets

(56) References Cited

U.S. PATENT DOCUMENTS

2016/0340050 A1 11/2016 Schmidt et al.
2019/0242421 A1 8/2019 Knorr et al.
2021/0040969 A1 2/2021 Calcagni

OTHER PUBLICATIONS

PennEngineering, Catalog for "Atlas Blind Threaded Inserts," pp. 1-34 & 56, Feb. 8, 2021.
Witten Company, Fasteners—NAS 1835, 3 pages, Sep. 9, 2009.

* cited by examiner

CARRIER FOR MOUNTING OF PANEL INSERTS

TECHNICAL BACKGROUND

Various physical elements, such as enclosures, protrusions, and structural members, can be mounted to panels, walls, platforms, or other similar surfaces. While direct usage of threaded fasteners can be employed, this typically is destructive to the panel, and cannot be reworked or reconfigured readily. Panel inserts have been developed which are screwed or adhered into boreholes made in the panel material. These panel inserts can accept fasteners, and once inserted, these fasteners are typically removable. However, several drawbacks are found with conventional panel inserts. First, insert pullout is a common failure mode, where the panel insert itself is destructively pulled out or ejected from the panel. This can degrade or destroy the local area of the panel, which requires expensive and time consuming repair. Some panel materials that employ potted-in panel inserts, such as polymer or carbon composite panels, can suffer unrepairable damage from insert pullout failure which requires replacement of the panel. Typically, pullout failure limits are far below the load capacity of the fasteners themselves, thus, pullout failure of panel inserts limits the capability and capacity of mounting physical elements to the panels.

Panels are commonly employed in spacecraft, such as on satellite buses that form the underlying chassis, structure, or enclosure of a spacecraft or satellite. Various on-board components are then mounted to these panels for deployment on the spacecraft. Example components include computer/controller equipment, power generation and conversion equipment, sensors, communication equipment, thermal management equipment, propulsion equipment, or other components. As mentioned above, the panels might have direct usage of fasteners, or conventional panel inserts to provide for mounting of these various components. However, since most satellite buses are customized to each mission, the panels are custom-made and need to fit into specific envelopes while providing mounting points for the components. As specifications and requirements change for spacecraft during the design and even into manufacturing phases, the panel mounting might need to be altered. This can necessitate replacement of panels, such as when composite panels are made, due to the nature of conventional panel inserts. One option is to delay manufacture of panels until a specification is finalized, which may require several iterations and wasted material, time, and cost, along with heighted risk from design mistakes or design changes. Moreover, since conventional panel inserts suffer from pullout failures relatively easily as compared to the fasteners employed, panel designs typically need to include more panel inserts to mitigate this failure mode, leading to increased cost, weight, and further barriers to design changes.

Overview

Panels of various types and configurations are commonly employed in spacecraft, such as on satellite buses that form the underlying chassis, structure, or enclosure of a spacecraft or satellite. On-board components are then mounted to these panels for deployment on the spacecraft. Described herein are various elements and systems for enhanced mounting of components to panels or other substrates. These elements and systems comprise carriers for panel inserts which can provide for mounting of fasteners or other members into various panels. The panel insert carriers allow for a universal mount into panels which can accept many different sizes or types of panel inserts that fit a standardized thread pattern of the carrier. Flanges on either end of a barrel that forms the carrier are configured to be flush with panel surfaces, and provide enhanced pull-out resistance for panel inserts. Moreover, rework or redesign of panels is reduced due in part to the carriers allowing for repeated removal and insertion of panel inserts suited to changing requirements. Various plugs, brackets, or mounts can be held by the carriers, providing for not only threaded fasteners but many other options for mounting equipment to panels. Since the carriers provide for removable inserts, a panel can be designed having a flexible grid pattern of carriers which can later accept any number and configuration of inserts to support fasteners, brackets, plugs, hooks, or other members without removal of the carrier from the panel.

In one example, a panel insert carrier comprises a barrel having flanged ends. The barrel comprising an axial bore therein having a threaded surface configured to removably accept a threaded insert. At least one of the flanged ends comprises an aperture for injection of potting around an exterior of the barrel when inserted into a bore hole of a panel. The axial bore can have a diameter selected to accept the threaded insert, where the threaded insert comprises an additional axial bore therein having a threaded surface configured to accept threaded fasteners.

In another example, an assembly includes a panel insert carrier and a panel insert removably coupled to the panel insert carrier. The panel insert carrier comprises a barrel having flanged ends configured to mount flush with a surface of panel. The barrel comprises an axial bore having a threaded surface removably coupled to the panel insert, where the panel insert comprises an additional axial bore having a threaded surface configured to accept threaded members.

In another example, a system comprises a panel and panel insert carriers coupled into bore holes of the panel forming a grid arrangement. Each of the panel insert carriers comprises a barrel having flanged ends. The barrel of each of the panel insert carriers comprises an axial bore having a threaded surface configured to removably accept a panel insert, where the panel insert comprises an additional axial bore having a threaded surface configured to accept threaded members.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Panel inserts, sometimes referred to as threaded inserts or potted-in inserts, are typically screwed or adhered into boreholes made in a panel material. These panel inserts can then accept removable fasteners while the panel inserts are permanently adhered or fastened into the material of the panels. Insert pullout failure is a common failure mode, where the panel insert itself is destructively pulled out or ejected from the panel from having too much force applied normal to the panel or too much force applied to shear the panel insert from the panel. Panel inserts are typically the weakest in pullout loading configurations, resulting in additional panel inserts needed for securing high-mass pieces of equipment, even though pullout failure limits are far below the load capability of the fasteners. Pullout failures destructively remove the affected panel insert which degrades or destroys the local area of the panel, requiring costly repair or often replacement of the panel. When employed on spacecraft, such as satellite buses, panels affected by pullout failures can be prohibitively expensive to replace, and can negatively impact manufacturing schedules.

Described herein are various elements and systems for enhanced mounting of components to panels or other substrates which reduce the aforementioned drawbacks of panel inserts. These enhanced elements and systems comprise panel insert carriers, also referred to as Universal Mount (UM) panel inserts, and can provide for mounting of fasteners or other members into various panels when fitted with panel inserts. These panel insert carriers allow for a universal mount on panels which can accept many different sizes or types of panel inserts that fit a standardized thread pattern of the panel insert carrier. Flanges on either end of a shaft or barrel that form the panel insert carrier are configured to be flush with panel surfaces, and are larger than panel inserts which provides enhanced pull-out and shear failure resistance.

Moreover, the need for rework or redesign of panels is reduced or eliminated due in part to the panel insert carriers allowing for repeated removal and insertion of different types or sizes of panel inserts to suit changing design requirements. Various plugs, brackets, or mounts can be inserted into the panel insert carriers, providing for not only threaded fasteners but many other options for mounting equipment to panels. Since the panel insert carriers provide for removable panel inserts, a panel can be designed having a flexible grid pattern of panel insert carriers which can later accept different sizes or types of panel inserts to support fasteners, brackets, plugs, hooks, studs, posts, cable standoffs, or other members without removal of the panel insert carrier from the panel or changing the design of the panel. The panel insert carriers herein can hold panel inserts that accept fastener sizes from approximately 0.375" down to 0.112" in diameter. Fasteners of different sizes can be installed from either side of a panel into the same panel insert carrier. Different types of threaded features can be used in addition to fasteners. Thus, the panel insert carriers described herein can allow for more flexible design of panels, such as used in spacecraft, that reduces the need for design customization on each program.

In many applications, the location, size, and type of panel inserts within panels may not be able to be finalized early in the design process. This can be the case in spacecraft design or satellite bus design when interface control documents for payloads are not finalized or available at the time of design of the parent structure, forcing equipment developers to commit to design choices prematurely or face costly rework procedures to alter a configuration or type of panel inserts. The use of the panel insert carriers described herein can allow for tighter manufacturing schedules by using standardized panels having arrays or grids of panel insert carriers which can be flexible with regard to later-finalized requirements and definitions for associated payloads.

Although spacecraft or satellite equipment is discussed herein, the enhanced panel insert carriers can be applied to any equipment or industry that is subjected to changing payloads. These industries include military cargo aircraft and helicopters, freight carriage (trucking, aircraft, railroad, or maritime). Moreover, the panel types can comprise various materials, such as metallic, wood, polymer, composite, or other materials having various internal structure or configurations, such as honeycomb or corrugations.

Figure 1:
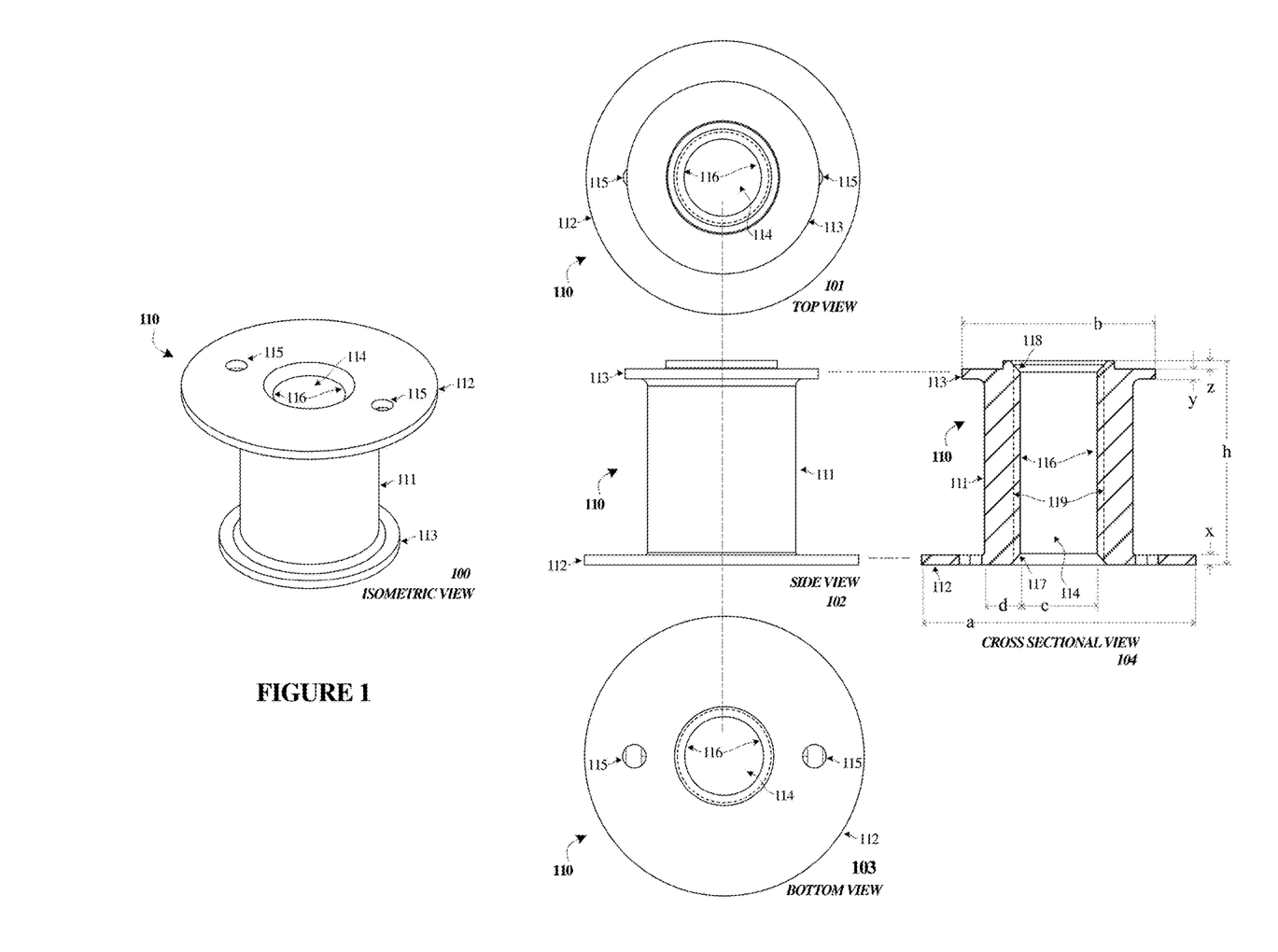
FIG. 1 illustrates a panel insert carrier in an implementation.

Turning to a first example of a panel insert carrier providing for a universal mount (UM) for panel inserts, FIG. 1 is presented. FIG. 1 includes several views 100-104 of panel insert carrier 110. Panel insert carrier 110 comprises a shaft or barrel 111 having first flange 112 and second flange 113 positioned on the ends of barrel 111. In isometric view 100, panel insert carrier 110 is shown in a bottom-side-up configuration to highlight features associated with flange 113. First flange 112 is larger in diameter than second flange 113, and first flange 112 has at least one aperture or hole to provide for injection of adhesive or potting when installed into a panel. In FIG. 1, two such apertures are shown, namely apertures 115, although a different quantity can be included in other examples.

Barrel 111 has a central bore 114 formed through the axial length of barrel 111. Axial bore 114 comprises internal surface 116. Although axial bore 114 is shown as formed in the entire axial length of barrel 111, other examples can employ other configurations of axial bore 114. For instance, a depth of the axial bore might only partially penetrate an axial length of barrel 111 when employed for 'blind' styles of panel insert carriers. Typically, internal surface 116 comprises threaded features 119 that form bore 114. Internal surface 116 may have these threaded features added after bore 114 is formed, or these threaded features can be formed during the formation of bore 114. Example thread type/size include 0.375-16 threads, referring to a 0.375 inch diameter bore with sixteen (16) threads-per-inch (TPI). Other thread type/sizes and metrics can be employed, such as metric measurements in millimeters along with thread pitch indications. Although details of specific threaded features 119 of internal surface 116 are not shown in FIG. 1 for clarity, such features are included and discussed herein. Internal surface 116 can also have beveled entry/exit features 117-118 which can ease entry of panel inserts or other members into bore 114.

Cross-sectional view 104 of FIG. 1 shows dimensional markings. The height (h) of panel insert carrier 110 will vary based on application, such as thickness of the panel into which panel insert carrier 110 is mounted. Example thicknesses include ½ inch, among others. The diameter (a) of first flange 112 is shown as greater than the diameter (b) of second flange 113. Central bore 115 is shown having diameter (c) with a wall thickness (d) which forms barrel 111. Other dimensions (x, y, and z) corresponding to thicknesses of flanges 112-113 depend upon the application, pullout resistance, material selections, panel flush mount requirements, and other factors.

Figure 2:
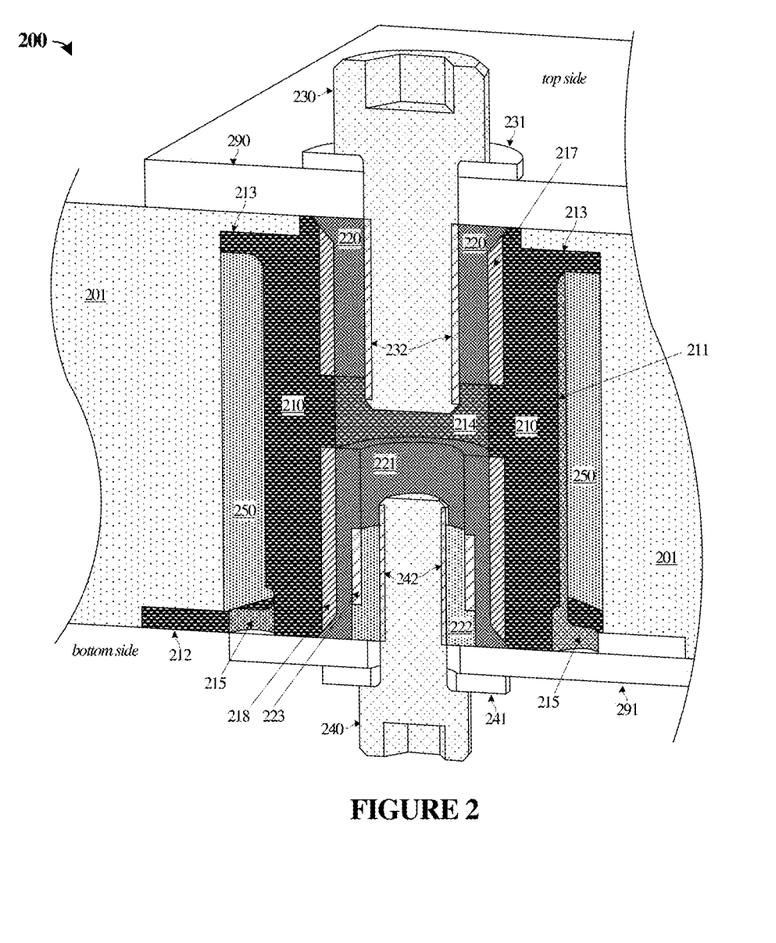
FIG. 2 illustrates a dual-sided panel insert carrier in an implementation.

FIG. 2 illustrates a dual-sided panel insert carrier in an implementation. FIG. 2 shows configuration 200 having panel 201 having a top side and bottom side, and with panel insert carrier 210 installed into a bore hole made into panel 201. On both sides of panel 201, panel insert carrier 210 can accept a panel insert and associated fastener. Specifically, on a top side of panel 201, panel insert 220 has been installed into a first end of panel insert carrier 210, while on a bottom side of panel 201, panel inserts 221-222 have been installed into a second end of panel insert carrier 210. Thus, the same insert can be used to mount components on both an interior side and exterior side of a panel. Representative threads on various elements are shown as threads 217-218 for threads associated with panel insert carrier 210, threads 223 for threads associated with panel inserts 221-222, threads 232 for threads associated with tope side fastener 230, and threads 242 for threads associated with bottom side fastener 240.

On the top side of panel 201, a first size of fastener (230) is inserted using a first size of panel insert (220) which is mounted into panel insert carrier 210. On the bottom side of panel 201, a second size of fastener (240) is inserted using a second size of panel inserts (221-222). Thus, the same size of panel inset carrier 210 can be configured to hold various sizes and types of fasteners using appropriately sized panel inserts. Also shown in FIG. 2 is optional washers 231 and 241 that accompany fasteners 230 and 240. Potting or adhesive material, such as epoxy, glue, or other materials, is shown as element 250 which is injected through one or more of apertures 215 after installation of panel insert carrier 210 into the bore hole of panel 201. After curing or drying, potting 250 ensures bonding of barrel 211 of panel insert carrier 210 to panel 201. Bonding techniques other than potting or adhesive can be employed, such as spot welding.

Thus, the configuration shown in FIG. 2 provides a flexible solution for mounting fasteners or other components on both sides of a panel. These fasteners or other components can be different sizes, types of components, types of fasteners, or have other different properties. As mentioned herein, components or modules other than fasteners can be mounted into the panel insert carried by panel insert carriers. These components or modules include a threaded stud which can include 'thru' configurations which has a stud penetrate the entire panel thickness for mounting components on both sides of the panel with a single stud. Studs can also be installed for items like cable P-clamp mounting, grounding straps, cable runways, and other items. Components can be installed flush to the panel, and thru sleeves can be manufactured to allow for close tolerance fits for long thru bolts.

Figure 3:
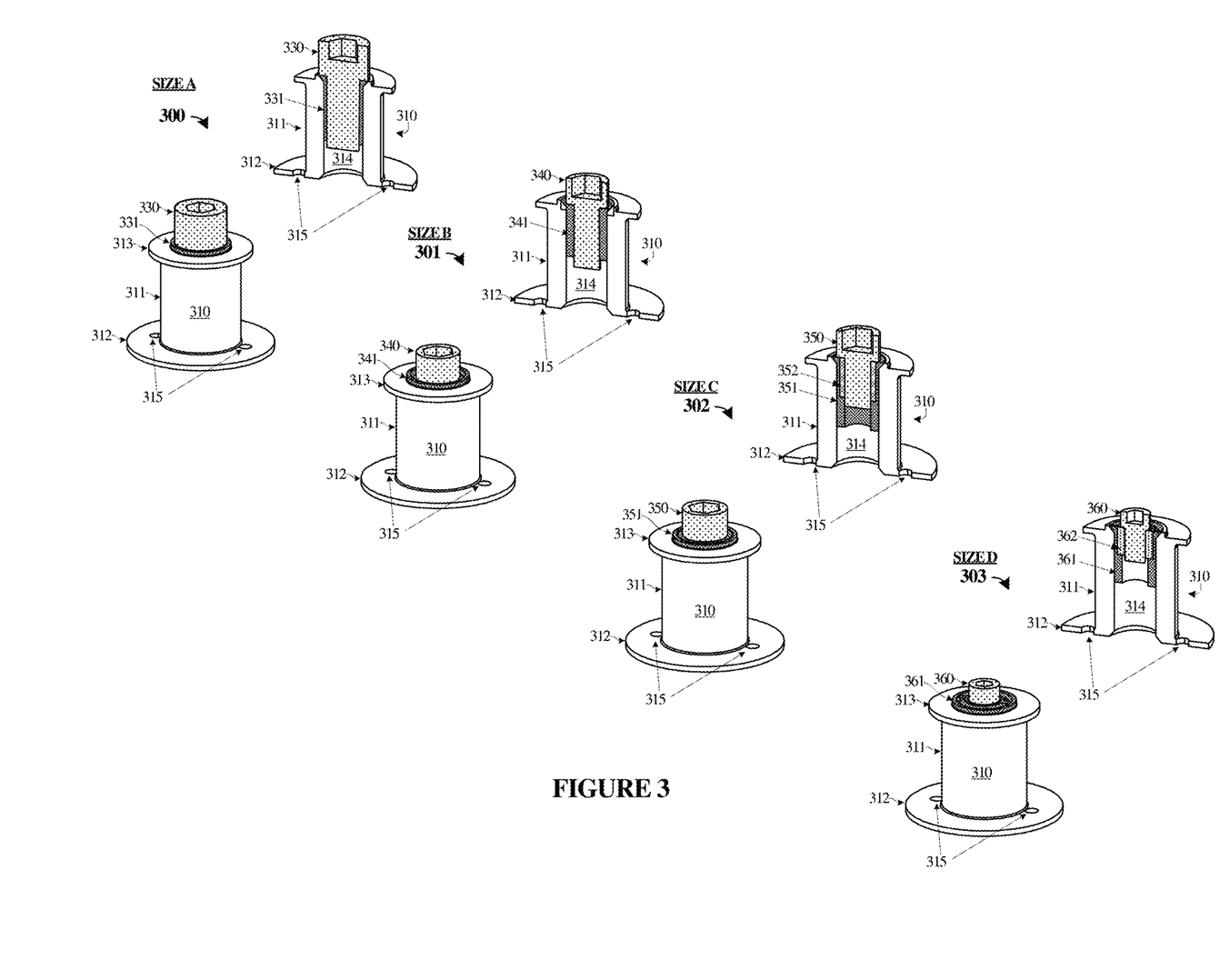
FIG. 3 illustrates panel insert carriers carrying various panel inserts in an implementation.

In some examples, panel inserts can be employed in panel insert carrier 310 to allow for 'thru' connections on the panel to a backside structure or component, such as for use in backing plates or stiffeners to support payloads or bulky components. Backside stiffeners can share bolts with payload adapter components to further reduce pullout failure beyond that of panel insert carrier 210 itself from the use of bearing plate load distributions established by the backside stiffeners. Such panel inserts can comprise thru sleeves that allow for close tolerance fits for long thru bolts coupled into panel insert carrier 210. Also, this configuration can reduce payload contact area with satellite bus panels to help with payload thermal isolation, or to not impede heat transfer between equipment and panels. Heat pipes can be embedded within panels and accommodated by the panel insert carriers. Also, usage of panel insert carriers does not prevent adding insulating or conducting materials between panels and equipment.

FIG. 3 illustrates a panel insert carrier configured to carry various sizes/types of panel inserts in an implementation, as shown by sizes 'A' through 'D' in views 300-303. In views 300-303, the same panel insert carrier 310 can accommodate a plurality of sizes or types of panel inserts and associated fasteners. Thus, once mounted into a panel, panel insert carrier 310 can subsequently accommodate changing requirements or changing needs of various components that may be mounted thereto. The various panel inserts can be removably inserted into panel insert carrier 310 such that later changes can be made without damaging panel insert carrier 310 or the panel into which panel insert carrier 310 is bonded. panel insert carrier 310 also includes similar features as seen in prior Figures, namely barrel 311, first flange 312, second flange 313, bore 314, and apertures 315. Advantageously, panel insert carrier 310 may have an internal bore thread specification of 0.375-16 (among others) while accommodating various sizes of fasteners using panel inserts to adapt the size and thread type of the desired fastener to that of panel insert carrier 310. These various sizes/thread configurations of fasteners include 0.112-40, 0.138-32, 0.164-32, 0.190-32, 0.190-24, 0.250-28, 0.250-20, or 0.375-16, among others.

In view 300, a size 'A' of panel insert is coupled to panel insert carrier 310, namely panel insert 331 which also is coupled to fastener 330 also having a corresponding size to couple to panel insert 331. Size 'A' might correspond to fastener 330 having dimensions/parameters of 0.250-20 UNJC-3B or 0.250-28 UNJF-3B. UNJ refers to a thread type (unified coarse (C) pitch threads or fine (F) pitch threads), 0.250 refers to a diameter in inches, 20 or 28 refers to the threads per inch (TPI), and 3B refers to the specific precision/class of fit. In view 301, a size 'B' of panel insert is coupled to panel insert carrier 310, namely panel insert 341 which also is coupled to fastener 340 also having a corresponding size to couple to panel insert 341. Size 'B' might correspond to fastener 340 having dimensions/parameters of 0.190-24 UNJC-3B or 0.190-34 UNJF-3B, with similar parametric definitions as mentioned above. In view 302, size 'C' of panel inserts are coupled to panel insert carrier 310, namely panel inserts 351-352. Inner insert 352 couples fastener 350 to outer insert 351, and outer insert 351 couples to panel insert carrier 310. Size 'C' might correspond to fastener 350 having dimensions/parameters of 0.164-32 UNJC-3B, with similar parametric definitions as mentioned above. In view 303, size 'D' of panel inserts are coupled to panel insert carrier 310, namely panel inserts 361-362. Inner insert 362 couples fastener 360 to outer insert 361, and outer insert 361 couples to panel insert carrier 310. Size 'D' might correspond to fastener 360 having dimensions/parameters of 0.138-32 UNJC-3B or 0.112-40 UNJF-3B, with similar parametric definitions as mentioned above.

Figure 4:
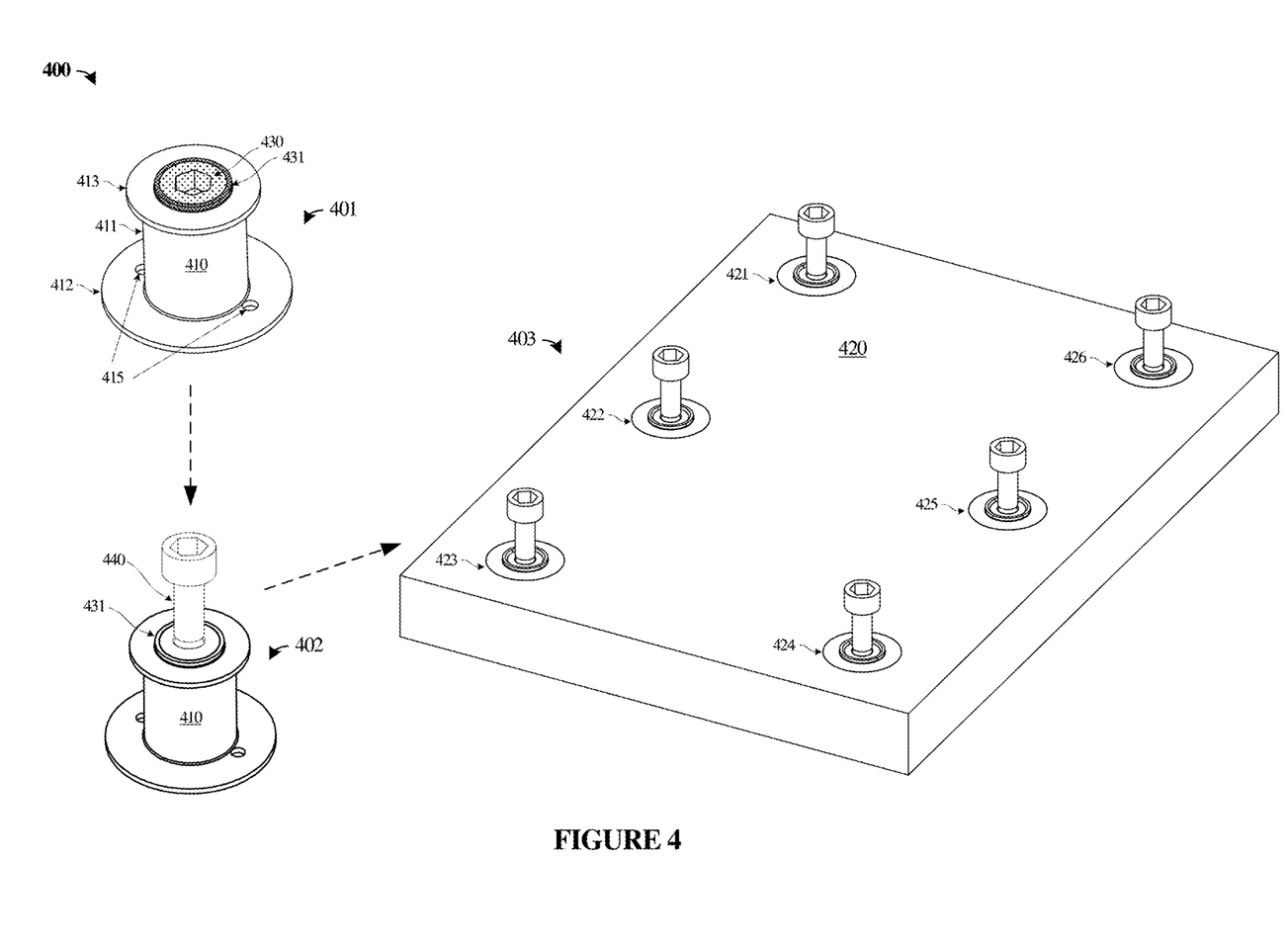
FIG. 4 illustrates panel insert carriers installed into a panel in an implementation.

FIG. 4 illustrates panel insert carriers installed into an exemplary panel in an implementation. Configuration 400 shows an example arrangement 401 where panel insert carrier 410 initially contains a plug module 430 coupled into panel insert 431, and panel insert carrier 410 with plug module 430 can be then installed (along with several instances of arrangement 401) during a manufacturing process for panel 420 shown in arrangement 403. Plug modules can comprise various types of plugs, such as electromagnetic interference (EMI) or electromagnetic compatibility (EMC) closeout plugs installed during manufacture of panels. Plug modules can be left installed in panel insert carriers that are not later used for coupling to fasteners. Plug module removal can be done to indicate where components are to be installed as a manufacturing aid to personnel. Configuration 402 shows details of exemplary fastener 440 installation after removal of plug module 430. Thus, the same panel insert 431 might be employed for plug module 430 and fastener 440. Alternatively, panel insert 431 might be removed after panel insert carrier 410 is installed in panel 420 (i.e. in situ) with another size or type of panel insert installed—without removal of panel insert carrier 410 from panel 420.

After installation of panel insert carrier 410 into panel 420 (along with other instances of such panel insert carrier), a versatile array or grid of panel insert carriers 421-426 is established in panel 420. Subsequently, plug module installed into panel insert carriers 421-426 can be removed from selected ones to then install various fasteners or other modules as needed. Thus, the configuration of an assembly that employs panel insert carriers 421-426 can be altered according to the final requirements of the assembly. Fastener sizes or types can be altered by removing and installing different panel inserts into selected panel insert carriers which employ a standardized base thread pattern and diameter. Unused panel insert carriers can have the plug modules left installed to block unwanted airflow, electromagnetic leakage, or to maintain thermal conductivity of the panel. Advantageously, the fastener size or type need not be known or determined at the time of the design and fabrication of the panel, and the flexibility of the thread-agnostic panel insert carriers can later accommodate a range of fastener options.

Example panels might also be employed to adapt mounting of modules to other panels. Various materials, thicknesses, and compositions can be employed for panel 420. For example, a 6.1 pcf core, Al 5056 core material, ⅛" cell size, 0.75" thick core can be employed. Example potting materials for installation of panel insert carriers into panel 420 can include EA9394 epoxy potting material, among other epoxies, polymers, adhesives, caulking, and the like. This might provide for allowable pullout of approximately 1700 lbf over fastener diameters of 0.138" to 0.375". In contrast, NAS 1833/34 thru panel inserts only have allowable pullout from 1110-1400 lbf, and NAS 1832 blind panel inserts have from 600-1200 lbf allowable pullout over fastener diameters of 0.138" to 0.375". Thus, the panel insert carriers discussed herein exhibit higher pullout characteristics then panel inserts alone.

Figure 5:
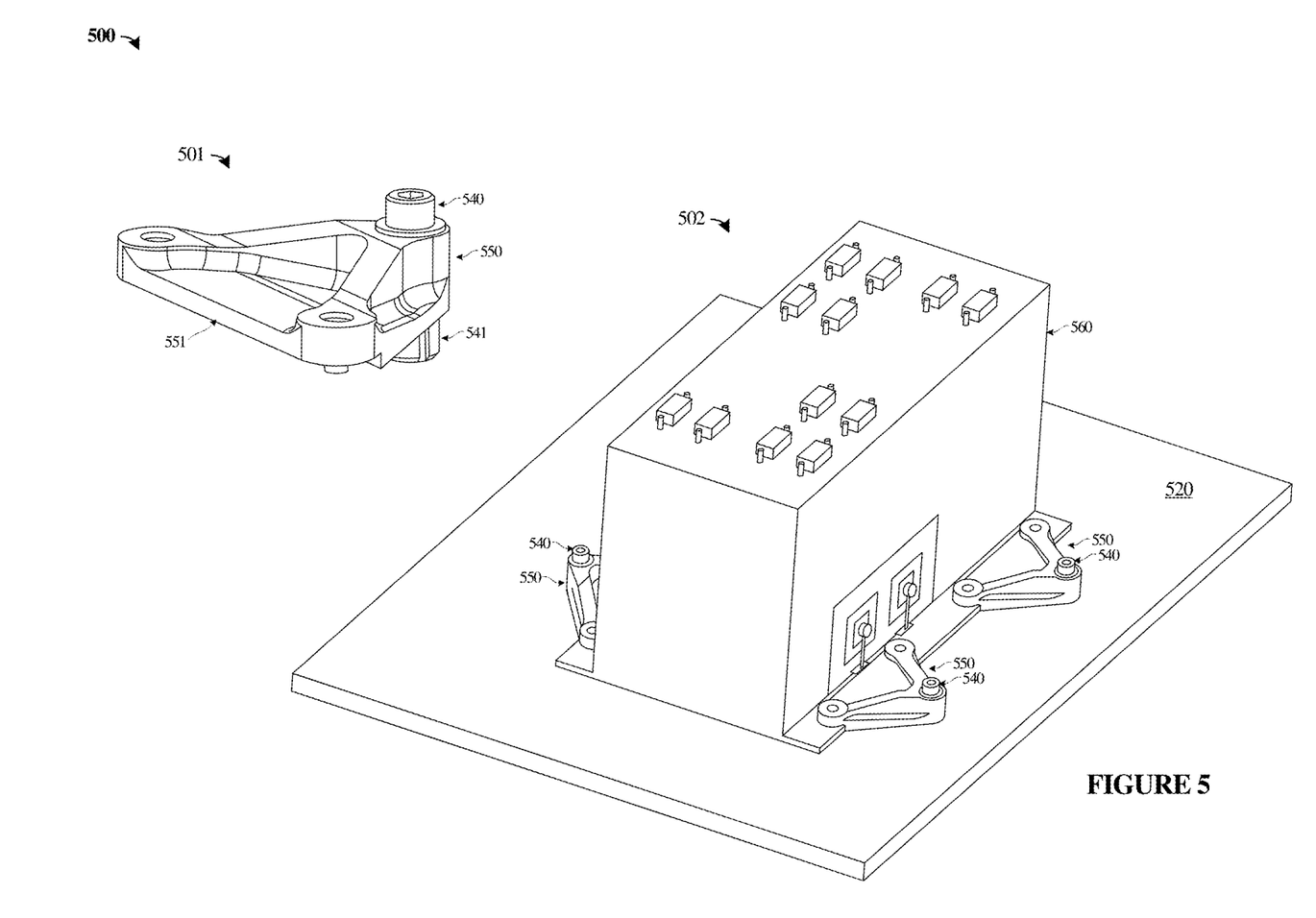
FIG. 5 illustrates panel insert carriers holding an example component in an implementation.

FIG. 5 illustrates configuration 500 with panel insert carriers holding an example component in an implementation. In this example, several clamp assemblies 550 are employed to couple electronics module 560 to panel 520 using a plurality of panel insert carriers (not shown) installed into panel 520. View 501 shows detail on clamp assembly 550 which includes clamp body 551 which is coupled to fastener 540 installed into panel insert 541. Panel insert 541 is installed into a corresponding panel insert carrier, such as when a grid or array of panel insert carriers is employed (see FIG. 4). View 502 shows one or more such clamp assemblies employed to hold various equipment or components to a panel. Electronics module 560 is clamped to panel 520 using four clamp assemblies (one clamp assembly is hidden in the isometric view). Electronics module 560 can comprise various equipment, such as bus equipment, diode boxes, avionics, computing modules, control modules, power modules, propulsion modules, inertial reaction modules, or other equipment.

Figure 6:
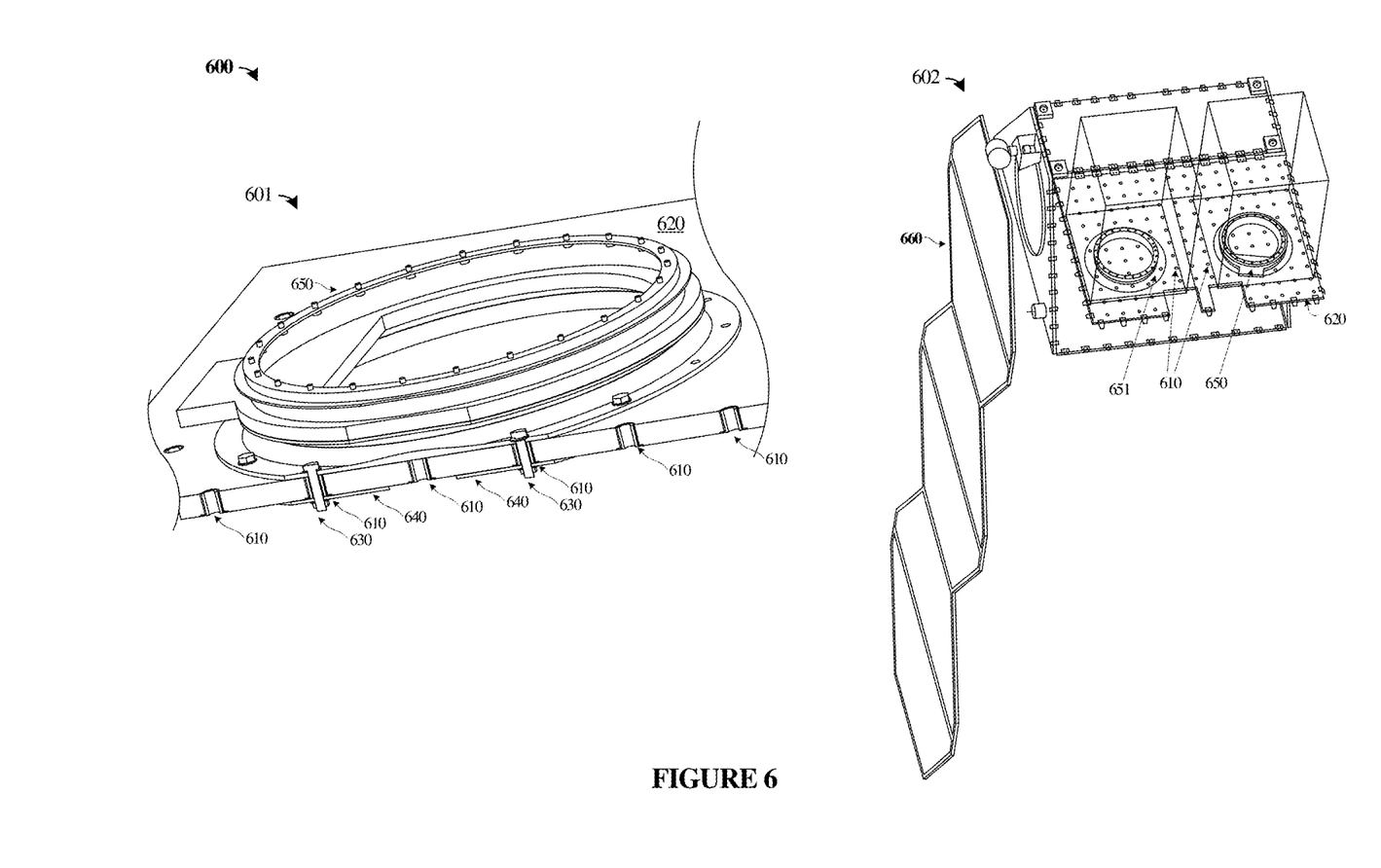
FIG. 6 illustrates panel insert carriers employed on a satellite bus in an implementation.

FIG. 6 illustrates configuration 600 having a plurality of panel insert carriers 610 employed on satellite device 660 in an implementation. Some satellite devices employ standardized payload adapter rings for coupling to payloads or to mate with other spacecraft. One such payload adapter includes the Evolved Expendable Launch Vehicle (EELV) Secondary Payload Adapter (ESPA) standard payload ring. View 601 shows an ESPA ring 650 mounted onto panel 620 using selected panel insert carriers 610 among a grid of panel insert carriers of panel 620. View 602 shows an example satellite device 660 having two ESPA rings 650-651 mounted into panel 620 which forms a structural portion of or 'bus' of satellite device 660. Various instances of panel insert carriers 610 can be employed to hold fasteners, studs, clamps, wiring harness features, thermal control features, or to form the actual structure of satellite device 660. Dual-sided panel insert carriers can be employed to couple components to both sides of panel 620, thus providing for internal and external component mounting from the same panel insert carriers. Unused panel insert carriers can be plugged to mitigate EMI/EMC concerns. Panel insert carriers may be used to protect an internal envelope/environment of satellite device 660 from external environments. Other examples may provide for windows/apertures for imaging devices of satellite device 660, and the windows can mount to panel insert carriers using fasteners, studs, or clamps.

Satellite bus development programs can suffer from long schedules and changing payload requirements which may not be known at the time of design of the satellite bus. Thus, costly rework, remanufacturing, or alterations of the satellite bus might be needed to accommodate later-defined payload requirements. By utilizing standardized grid patterns of panel insert carriers, satellite buses can be designed with flexibility to a wide range of payload requirements. Schedule reductions and the need for design customization can be reduced on satellite bus design and fabrication which can suit various payload requirements which may be unknown or undefined at the time of fabrication. Standardized satellite bus designs can be provided having panels with grids of panel insert carriers which can accommodate a variety of later-defined panel insert and payload configurations.

Moreover, several design advantages are provided by usage of the panel insert carriers discussed herein. For example, the materials that comprise composite panels cannot directly accept threaded-in inserts and instead requires potted-in inserts. The panel insert carriers discussed herein can be installed into composite panels and then subsequently accept many different sizes of threaded inserts. When installed, the panel insert carriers exhibit 20% to 232% increase in pullout strength over standard thru and blind composite panel inserts. Designs that employ the panel insert carriers can then allow for installation of other standard threaded inserts into a composite panel, which might otherwise not be appropriate for installation into a composite panel. Thus, the panel insert carriers can act as interfaces between material types to host otherwise incompatible panel inserts or fasteners. Designs that employ panel insert carriers can allow for repair of damaged threads in a panel insert by removal of the panel insert from the panel insert carrier and replacement of the panel insert into the same unaffected panel insert carrier. Designs can provide for installation of multiple types of panel inserts simultaneously into a both ends of single panel insert carrier. The panel insert carriers can allow for installation of other standard panel inserts to accommodate many different fastener sizes within the bore of single panel insert carrier having a defined thread pattern. Other components can be installed into panel insert carriers than fasteners, such as studs, hooks, close tolerance sleeves, cable supports, EMI plugs, grounding contacts, or other components not normally installable into panel inserts or which require specialized panel inserts. Moreover, the panel insert carriers can provide for installation of fasteners from either side of a panel insert carrier, as well as provide for later modification of panel inserts to support different fastener sizes than originally intended without removal of the panel insert carriers from the corresponding panel. Due in part to the increased pullout capability of the panel insert carriers from the larger flange sizes and typical for panel inserts, larger and heavier payloads can be accommodated into panels without pullout failures.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A panel insert carrier, comprising:
    a barrel comprising a first axial bore disposed therein from a first flanged end, the first axial bore having a first threaded surface configured to removably accept a first threaded insert that further is configured to removably accept a first threaded fastener;
    the barrel comprising a second axial bore disposed therein from a second flanged end, the second axial bore having a second threaded surface configured to removably accept a second threaded insert that further is configured to removably accept a second threaded fastener;
    the first flanged end comprising a protrusion circumferential about the first axial bore configured to sit flush with a first surface of a panel and provide a mounting depth for a further circumferential portion of the first flanged end to be retained below the first surface of the panel by the first surface of the panel; and
    the second flanged end configured to sit flush with a second surface of the panel.

2. The panel insert carrier of claim 1, comprising:
    the first axial bore and the second axial bore each having a diameter selected to conform to a standardized outer diameter of threaded inserts having varying internal thread sizes configured to accept corresponding threaded fasteners.

3. The panel insert carrier of claim 1, comprising:
    the first axial bore and the second axial bore each having a diameter selected to accept a corresponding threaded panel insert, wherein the corresponding threaded insert comprises an additional axial bore therein having an interior surface configured to accept corresponding threaded fasteners.

4. The panel insert carrier of claim 1, comprising:
    the first axial bore configured to accept the first threaded insert having a different diameter or thread pattern than the second axial bore or second threaded insert.

5. The panel insert carrier of claim 1, wherein a depth of the first axial bore only partially penetrates an axial length of the barrel; and
    wherein a depth of the second axial bore penetrates a remaining axial length of the barrel.

6. The panel insert carrier of claim 1, wherein an aperture in at least one of the flanged ends comprises an injection aperture for potting around an exterior of the barrel when inserted into a bore hole of a panel, and wherein the at least one of the flanged ends comprises an additional aperture for expulsion of air or potting during injection of the potting.

7. The panel insert carrier of claim 1, wherein the second flanged end is larger in diameter than the first flanged end.

8. The panel insert carrier of claim 1, wherein the first threaded surface provides for removal of an initial first threaded insert and insertion of a subsequent first threaded insert while the barrel remains installed into the bore hole of the panel;
    wherein the second threaded surface provides for removal of an initial second threaded insert and insertion of a subsequent second threaded insert while the panel insert carrier remains installed into a bore hole of the panel.

9. The panel insert carrier of claim 1, wherein the first flanged end and the second flanged end each comprise chamfered edges at the axial bore configured to ease insertion of the corresponding threaded insert.

10. An assembly, comprising:
    a panel insert carrier;
    a first threaded insert coupled to the panel insert carrier from a first flanged end;
    a second threaded insert coupled to the panel insert carrier from a second flanged end;
    the panel insert carrier comprising:
        the barrel comprising a first axial bore from the first flanged end having a first threaded surface configured to removably accept the first threaded insert that is further configured to removably accept a first threaded member;
        the barrel comprising a second axial bore from the second flanged end having a second threaded surface configured to removably accept the second threaded insert that is further configured to removably accept a second threaded member;
        wherein the first flanged end comprises a protrusion circumferential about the first axial bore configured to sit flush with a first surface of a panel and provide a mounting depth for a further circumferential portion of the first flanged end to be retained below the first surface of the panel by the first surface of the panel; and
        the second flanged end configured to sit flush with a second surface of the panel.

11. The assembly of claim 10, comprising:
the first axial bore and the second axial bore each having a diameter selected to conform to an outer diameter of panel threaded inserts having varying internal thread sizes configured to accept corresponding threaded members.

12. The assembly of claim 10, comprising:
the first axial bore configured to accept the first threaded insert having a different diameter or thread pattern than the second axial bore or second threaded insert.

13. The assembly of claim 10, wherein a depth of the first axial bore only partially penetrates an axial length of the barrel; and
wherein a depth of the second axial bore penetrates a remaining axial length of the barrel.

14. The assembly of claim 10, the panel insert carrier further comprising:
at least one among the first flanged end and the second flanged end comprise a first aperture for injection of potting around an exterior of the barrel when inserted into a bore hole of the panel, and comprise a second aperture for expulsion of air or potting during injection of the potting.

15. The assembly of claim 14, wherein the second flanged end is larger in diameter than the first flanged end.

16. The assembly of claim 10, wherein the first threaded surface provides for removal of an initial first threaded insert and insertion of a subsequent first threaded insert while the panel insert carrier remains installed into a bore hole of the panel; and
wherein the second threaded surface provides for removal of an initial second threaded insert and insertion of a subsequent second threaded insert while the panel insert carrier remains installed into a bore hole of the panel.

17. The assembly of claim 10, wherein the first flanged end and the second flanged end each comprise chamfered edges at the axial bore configured to ease insertion of the corresponding threaded insert.

18. A system, comprising:
a panel;
one or more panel insert carriers coupled into bore holes of the panel that penetrate an entire thickness of the panel;
each of the panel insert carriers comprising:
a barrel comprising a first axial bore disposed from a first flanged end, the first axial bore having a first threaded surface configured to removably accept a first threaded insert that further is configured to removably accept a first threaded member;
the barrel comprising a second axial bore disposed therein from a second flanged end, the second axial bore having a second threaded surface configured to removably accept a second threaded insert that further is configured to removably accept a second threaded member;
the first flanged end comprising a protrusion circumferential about the first axial bore configured to sit flush with a first surface of a panel and provide a mounting depth for a further circumferential portion of the first flanged end to be retained below the first surface of the panel by the first surface of the panel; and
the second flanged end configured to sit flush with a second surface of the panel.

19. The system of claim 18, wherein the first threaded surface provides for removal of an initial first threaded insert and insertion of a subsequent first threaded insert while the corresponding panel insert carrier remains installed into the corresponding bore hole of the panel; and
wherein the second threaded surface provides for removal of an initial second threaded insert and insertion of a subsequent second threaded insert while the panel insert carrier remains installed into a bore hole of the panel.

20. The system of claim 18, wherein the first axial bore and the second axial bore each comprise a diameter selected to conform to an outer diameter of threaded inserts having varying internal thread sizes configured to accept corresponding threaded members.

* * * * *